United States Patent
Miyaji et al.

(10) Patent No.: US 8,517,408 B2
(45) Date of Patent: Aug. 27, 2013

(54) SIDE STAND SWITCH AND SIDE STAND DEVICE

(75) Inventors: Akira Miyaji, Miyagi-ken (JP); Hideki Abe, Miyagi-ken (JP)

(73) Assignees: Alps Electric Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 13/209,985

(22) Filed: Aug. 15, 2011

(65) Prior Publication Data

US 2012/0056402 A1   Mar. 8, 2012

(30) Foreign Application Priority Data

Sep. 6, 2010 (JP) ................................. 2010-198771

(51) Int. Cl.
*B62H 1/02* (2006.01)
(52) U.S. Cl.
USPC ........................................................ 280/301
(58) Field of Classification Search
USPC ................................................ 280/293, 301
See application file for complete search history.

(56) References Cited

U.S. PATENT DOCUMENTS

| 4,883,284 | A  | * | 11/1989 | Nakazawa et al. | 280/293 |
| 6,918,607 | B2 | * | 7/2005  | Nakazawa et al. | 280/301 |
| 2004/0212172 | A1 | * | 10/2004 | Nakazawa et al. | 280/293 |
| 2009/0066057 | A1 | * | 3/2009  | Nakazawa et al. | 280/301 |

FOREIGN PATENT DOCUMENTS

JP   2004-231094   8/2004

* cited by examiner

*Primary Examiner* — Kevin Hurley
(74) *Attorney, Agent, or Firm* — Beyer Law Group LLP

(57) ABSTRACT

A side stand switch includes a case member having a fixed contact; and a rotor body having a moving contact that can come into contact with the fixed contact, mounted by tightening a securing bolt, and turned together with a side stand bar with respect to the case member. The rotor body has an engagement pin inserted therein and to be inserted into an engagement hole formed in the side stand bar. A width of the engagement pin in the turning direction of the rotor body is larger at a base portion inside the rotor body than at a tip portion protruding from the rotor body.

12 Claims, 11 Drawing Sheets

SIDE STAND SWITCH AND SIDE STAND DEVICE

CLAIM OF PRIORITY

This application claims benefit of Japanese Patent Application No. 2010-198771 filed on Sep. 6, 2010, which is hereby incorporated by reference.

BACKGROUND OF THE INVENTION

1. Field of the Invention

The present invention relates to side stand switches and side stand devices. In particular, the present invention relates to a side stand switch capable of detecting a pivot position of a side stand bar that supports a two-wheeled vehicle, such as a motorcycle, and also relates to a side stand device including the side stand switch.

2. Description of the Related Art

Generally, a motorcycle is provided with a side stand device that supports the vehicle body in a standing state while the motorcycle is parked. The side stand device is constructed by pivotally attaching a side stand bar through a pivot-bolt to a bracket on a vehicle body frame, and mounting a side stand switch through a securing bolt to the pivot-bolt. The side stand switch includes a case member having a fixed contact and a rotor member having a moving contact. The side stand switch detects a pivot position of the side stand bar when the rotor member is turned together with the side stand bar.

In the related art, a side stand switch that detects a pivot position of a side stand bar is known in which a rotor member is engaged with the side stand bar through a pin (see, e.g., Japanese Unexamined Patent Application Publication No. 2004-231094). As illustrated in FIG. 11, in a side stand switch 91, a case member 98 is rotationally restricted by a restricting pin 97 protruding from a bracket 92, and an engagement pin 101 protruding from a rotor member 99 is engaged in an engagement hole 103 of a side stand bar 93. In this state, a securing bolt 96 is inserted into a central opening of the case member 98 and the rotor member 99 and tightened in a screw hole 102 in a head portion of a pivot-bolt 94. This secures the side stand switch 91 to the pivot-bolt 94. When the side stand bar 93 pivots, the rotor member 99 rotates through the engagement pin 101. Thus, the pivot position of the side stand bar 93 is detected.

In the side stand switch 91 of the related art, during tightening of the securing bolt 96, a rotation torque of the securing bolt 96 causes the rotor member 99 to follow the rotation of the securing bolt 96. This causes a large torque load to be applied to the engagement pin 101. In particular, when the rotor member 99 is made of material of relatively low strength, such as resin, the engagement pin 101 may be damaged by the torque load applied thereto during tightening of the securing bolt 96.

The present invention has been made in view of the circumstances described above. The present invention provides a side stand switch and a side stand device in which an engagement pin in a rotor member can be prevented from being damaged during tightening of a fastening member.

SUMMARY OF THE INVENTION

A side stand switch according to an aspect of the present invention includes a case member having a fixed contact; and a rotor member having a moving contact that can come into contact with the fixed contact, mounted by tightening a fastening member, and turned together with a side stand bar with respect to the case member. The rotor member has an engagement pin inserted therein and to be inserted into an engagement hole formed in the side stand bar. A width of the engagement pin in the turning direction of the rotor member is larger at a base portion inside the rotor member than at a tip portion protruding from the rotor member.

With this configuration, where the width of the engagement pin is larger at the base portion than at the tip portion, a stress concentration point that appears in the engagement pin can be brought closer to the tip portion to which a torque load is applied by tightening the fastening member. This can reduce a load applied to the stress concentration point by tightening the fastening member, enhance the strength of the engagement pin against the torque load, and prevent the engagement pin from being damaged.

According to another aspect of the present invention, in the side stand switch, the base portion of the engagement pin may be formed such that the width in the turning direction of the rotor member gradually increases in a direction opposite the protruding direction.

With this configuration, where the width of the base portion of the engagement pin gradually increases in the direction opposite the protruding direction, the stress concentration point can be brought closer to the tip portion with a simple shape. Additionally, the torque load is distributed at the base portion of the engagement pin. Therefore, it is possible to prevent the entire engagement pin from leaning due to the torque load, and allow the rotor member to integrally support the engagement pin.

According to another aspect of the present invention, in the side stand switch, the base portion of the engagement pin may be formed such that contact faces thereof in contact with the rotor member in the turning direction of the rotor member each have at least one protrusion and one indentation.

With this configuration, where the base portion of the engagement pin is engaged with the rotor member on the contact faces each having at least one protrusion and one indentation, the engagement can prevent the entire engagement pin from leaning due to the torque load and allow the rotor member to integrally support the engagement pin.

According to another aspect of the present invention, in the side stand switch, the rotor member may be molded of resin, and the engagement pin may be made of metal.

With this configuration, where the rotor member is molded of resin, the degree of freedom in designing the shape of the rotor member can be improved. Additionally, as compared to the case where the rotor member is molded of metal, the manufacturing cost of molding can be reduced. The weight of the side stand switch can also be reduced. Since the area of metal surface of the side stand switch is reduced, the cost of rust preventive plating can be reduced. At the same time, since the engagement pin is made of metal, which is high in strength, the engagement pin can be prevented from being damaged even if an unexpected large force is applied thereto by tightening of the fastening member, pivoting of the side stand bar, etc.

According to another aspect of the present invention, in the side stand switch, the rotor member may include a rotor body having the moving contact and the engagement pin, and a torque receiving member relatively rotatably engaged with the rotor body and configured to receive a torque produced by tightening the fastening member. The rotor body may receive the torque through the torque receiving member.

With this configuration, where the rotor body receives a torque produced by tightening the fastening member through the torque receiving member, the torque is not directly transmitted from the fastening member to the rotor body. Since the rotor body and the torque receiving member are relatively rotatably engaged with each other, the relative rotation of the rotor body and the torque receiving member absorbs the torque and reduces the torque received by the rotor body. Therefore, since the torque load applied to the engagement pin in the rotor body can be reduced, the engagement pin can be prevented from being damaged by tightening the fastening member.

According to another aspect of the present invention, in the side stand switch, the side stand bar may be pivotally attached through a pivot-bolt to a bracket on a vehicle body frame; the fastening member may be a securing bolt configured to mount the rotor member to the pivot-bolt; the torque receiving member may have a tubular shape with a bore into which a shaft portion of the securing bolt is to be inserted, a back surface of a head portion of the securing bolt may be brought into contact with one end face of the torque receiving member in an axial direction, and an upper surface of a head portion of the pivot-bolt may be brought into contact with the other end face of the torque receiving member in the axial direction; and the rotor body may be separated from the back surface of the head portion of the securing bolt at one end face adjacent to the head portion of the securing bolt in the axial direction.

With this configuration, where the one end face of the torque receiving member in the axial direction is in contact with the back surface of the head portion of the securing bolt and the one end face of the rotor body in the axial direction is separated from the back surface of the head portion of the securing bolt, the rotor body does not directly receive a torque from the securing bolt during tightening of the securing bolt.

A side stand device according to an aspect of the present invention includes a side stand bar configured to support a vehicle body in a standing state, a bracket on a vehicle body frame, a pivot-bolt configured to pivotally attach the side stand bar to the bracket, the side stand switch, and a securing bolt configured to mount the side stand switch to the pivot-bolt by being tightened.

With this configuration, it is possible to improve strength of an engagement pin of the side stand switch, the engagement pin being engaged with the side stand bar when the securing bolt it tightened. It is also possible to improve durability of the engagement pin when the side stand switch is mounted by tightening the securing bolt.

DESCRIPTION OF THE PREFERRED EMBODIMENTS

In a side stand switch included in a side stand device for a motorcycle, a rotor member is engaged with a side stand bar through an engagement pin. In the side stand switch, during tightening of a fastening member, a rotation torque from the fastening member strongly acts on the engagement pin. Therefore, it is necessary to ensure durability of the engagement pin. At the same time, there is a demand for lightweight low-cost side stand switches. It is thus desired that the rotor member be made of material of relatively low strength, such as resin.

Figure 10:
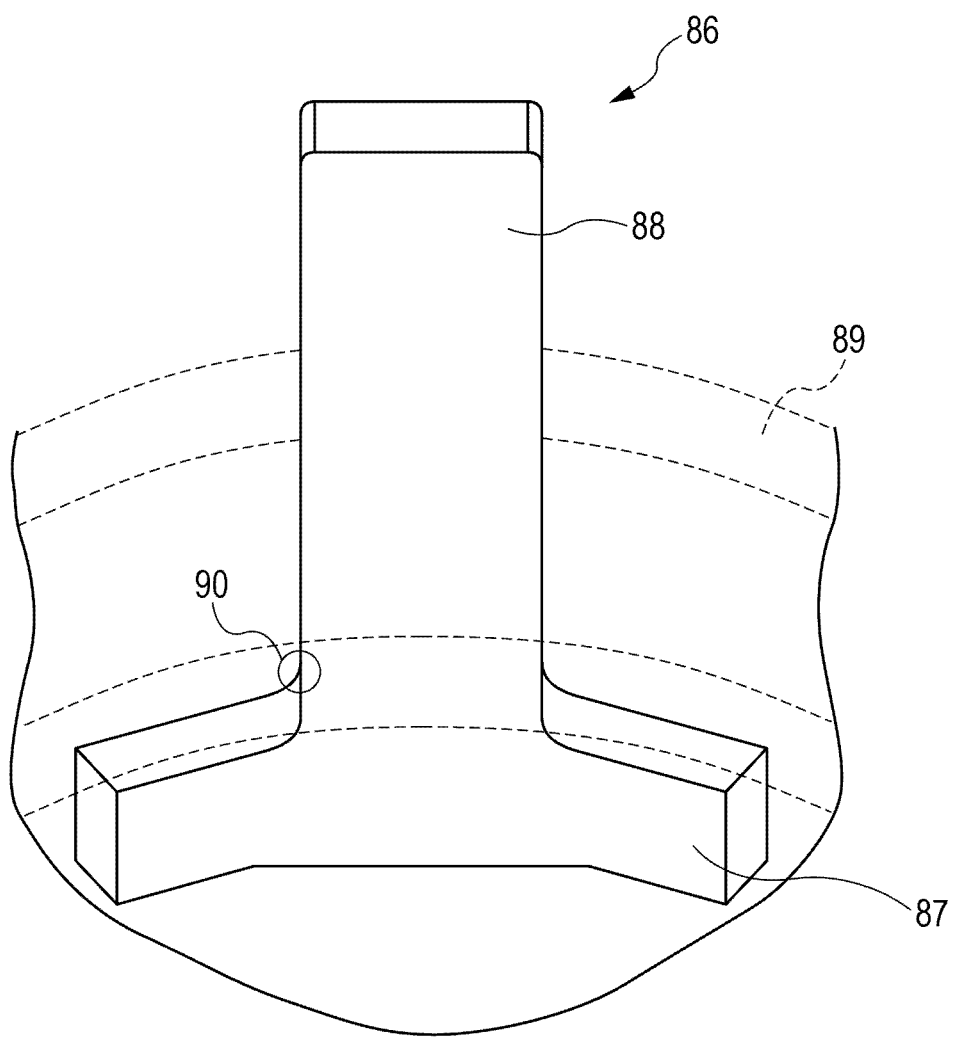
FIG. 10 is a perspective view illustrating an engagement pin of a side stand switch according to another embodiment of the present invention.
Figure 11:
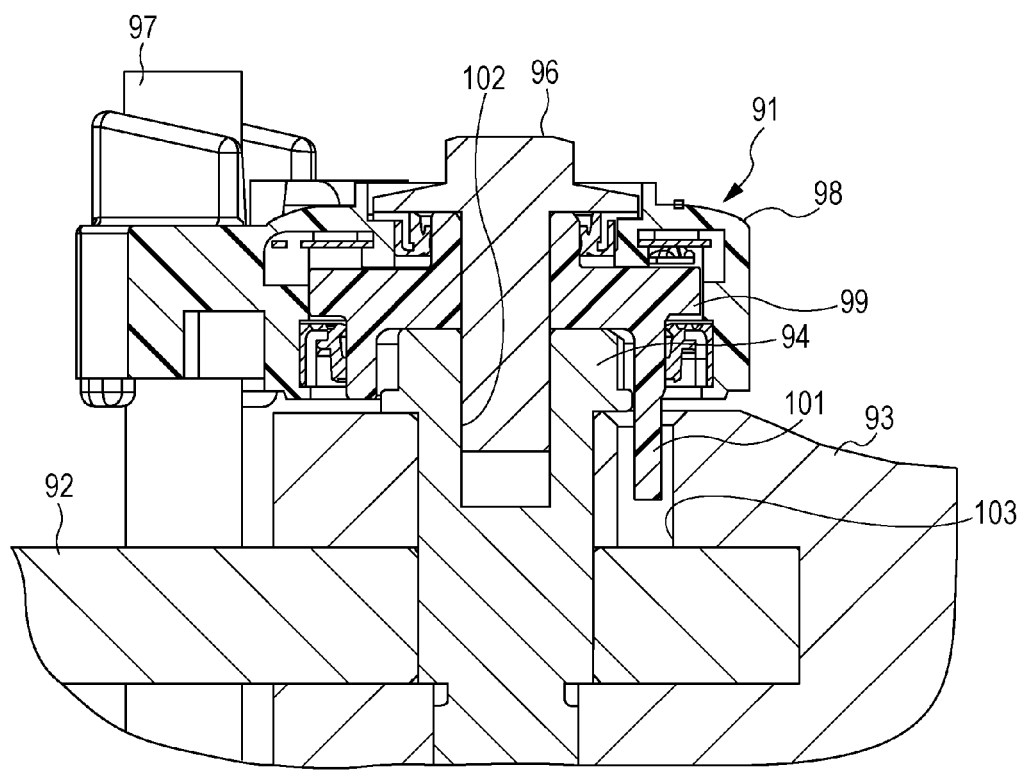
FIG. 11 illustrates a side stand switch according to related art of the present invention.

It may be possible that the rotor member be made of resin, and that the engagement pin made of metal be insert-molded in the rotor member made of resin. However, it is difficult in this case to ensure sufficient durability of the engagement pin. To solve this problem, the present applicant devised an engagement pin illustrated in FIG. 10. As illustrated, an engagement pin 86 is formed of a T-shaped metal plate to improve connection with a rotor member 89. Specifically, a base portion 87 of the engagement pin 86 extends along a peripheral wall of the rotor member 89 and is inserted in the rotor member 89 for tight connection with the rotor member 89.

However, the T-shape of the engagement pin 86 causes a stress concentration point 90 to appear, during tightening of a fastening member, in the vicinity of the base portion 87 remote from a tip portion 88 to which a torque load is applied. Since a large load is applied to the stress concentration point 90 of the engagement pin 86, it is difficult to sufficiently improve strength of the engagement pin 86 against the torque load. The strength of the engagement pin 86 may be improved by increasing the thickness of the engagement pin 86. However, if the dimensions of the engagement pin 86 are specified, it is not possible to increase the thickness of the engagement pin 86.

In view of the points described above, the present inventors have found a technique in which a stress concentration point is brought closer to a tip portion of an engagement pin. In this technique, the engagement pin is larger in width at a portion embedded in a rotor member than at a portion protruding from the rotor member. The present inventors have thus come up with the present invention. That is, the gist of the present invention is to reduce a load applied to a stress concentration point by bringing the stress concentration point closer to a tip portion of an engagement pin, and improve strength of the engagement pin against a torque load to prevent the engagement pin from being damaged.

Embodiments of the present invention will now be described in detail with reference to the attached drawings. The following description refers to the case where the present invention is applied to a side stand device for a motorcycle. However, the application of a side stand switch of the present embodiment is not limited to this and can be modified appropriately.

Figure 1:
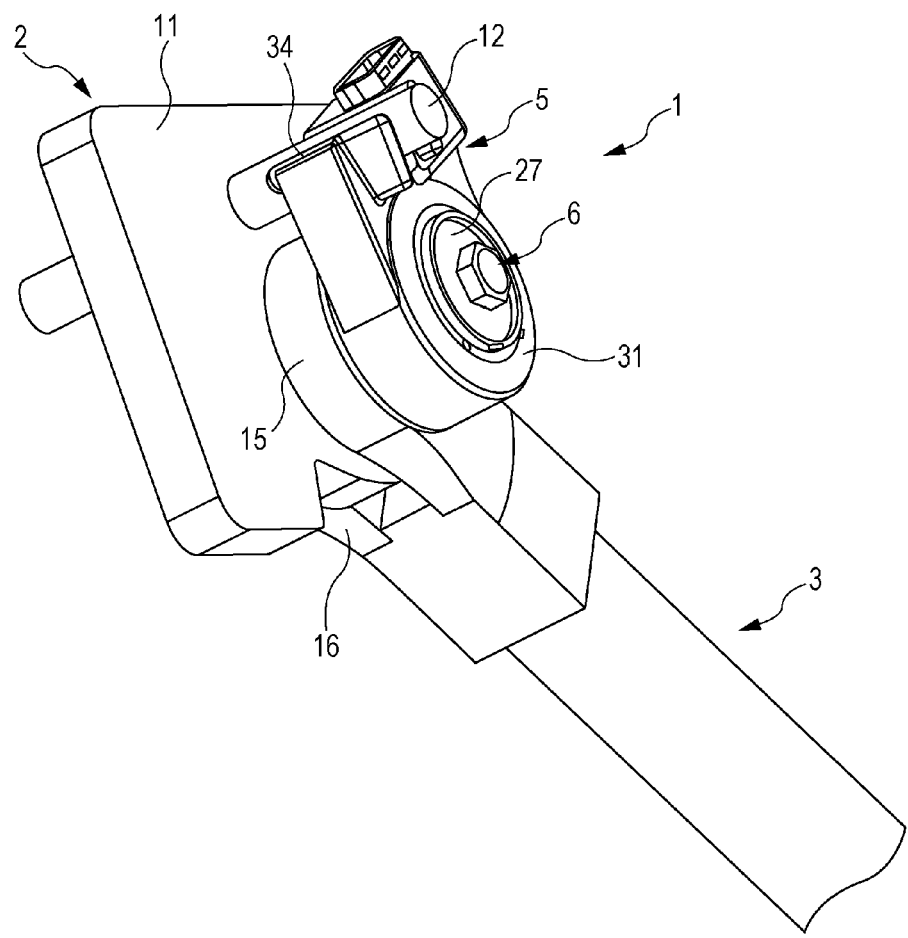
FIG. 1 is a perspective view of a side stand device according to an embodiment of the present invention.
Figure 2:
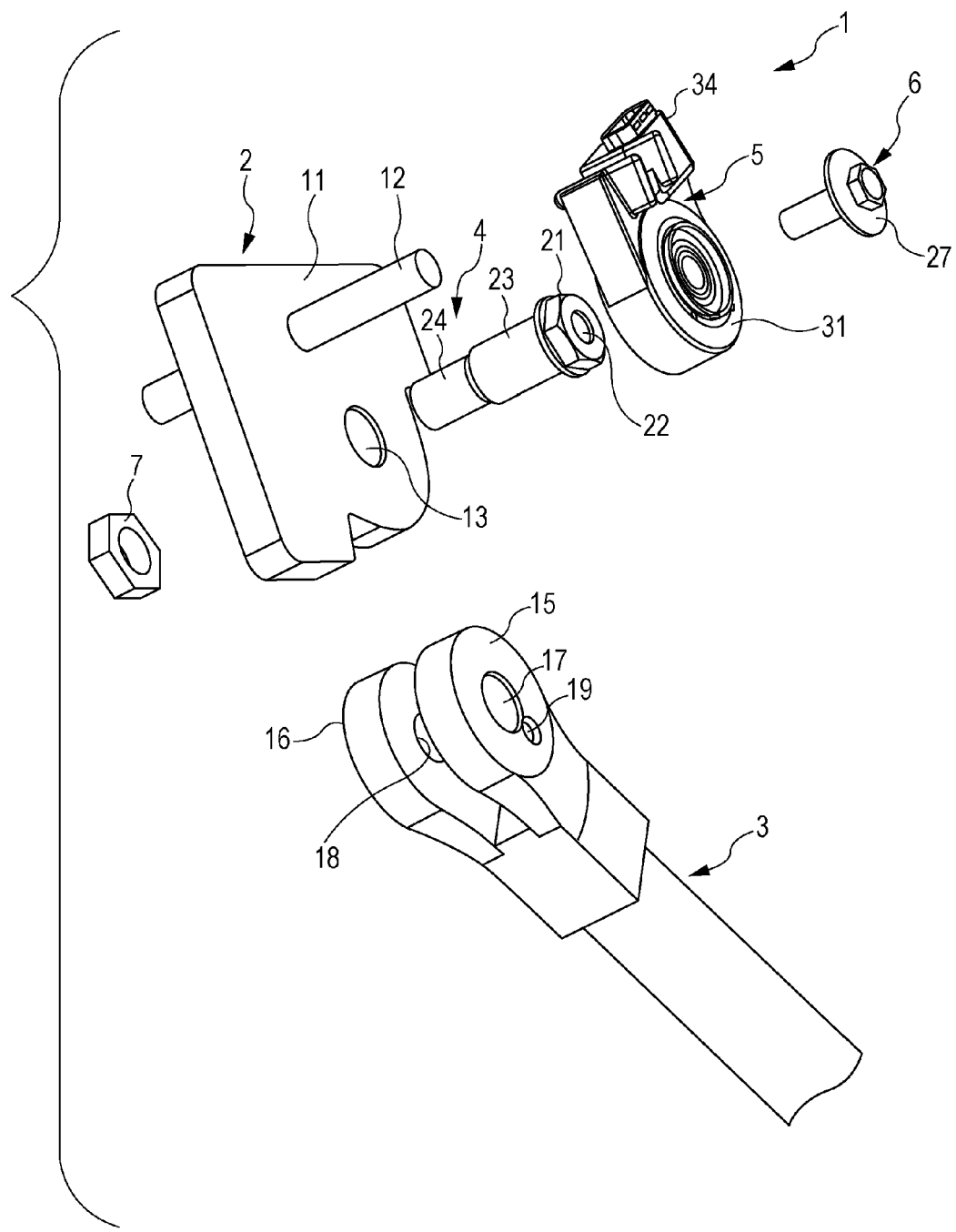
FIG. 2 is an exploded perspective view of the side stand device.

An overall configuration of a side stand device will now be described with reference to FIG. 1 and FIG. 2. FIG. 1 is a perspective view of a side stand device 1 according to an embodiment of the present invention. FIG. 2 is an exploded perspective view of the side stand device 1.

The side stand device 1 of the present embodiment illustrated in FIG. 1 and FIG. 2 supports a motorcycle in a standing state while the motorcycle is parked. As illustrated, the side stand device 1 includes a bracket 2 on a vehicle body frame (not shown) and a side stand bar 3 pivotally attached through a pivot-bolt 4 to the bracket 2. The side stand device 1 also includes a side stand switch 5 mounted on the pivot-bolt 4 through a securing bolt 6. The side stand switch 5 detects a pivot position of the side stand bar 3.

The bracket 2 has a plate portion 11 and a through pin 12 passing through the plate portion 11 in the thickness direction and secured. The plate portion 11 has a bore 13 at a position where the side stand bar 3 is attached. The bore 13 passes through the plate portion 11 in the thickness direction. One part of the through pin 12 serves as a positioning pin for positioning the side stand switch 5, while the other part of the through pin 12 serves as an anchoring pin anchored to a return spring (not shown).

The side stand bar 3 is attached to the bracket 2 by the pivot-bolt 4. The side stand bar 3 is configured to pivot about the pivot-bolt 4. The side stand bar 3 can pivot between a standing position at which the side stand bar 3 is in contact with the ground and a retracted position at which the side stand bar 3 is substantially horizontal to the ground. The side stand bar 3 is provided with a pair of connecting portions 15 and 16 between which the plate portion 11 of the bracket 2 is to be sandwiched. The connecting portions 15 and 16 have bores 17 and 18, respectively, that pass therethrough. The connecting portion 15 has an engagement hole 19 near the bore 17. The engagement hole 19 passes through the connecting portion 15 and is to be engaged with the rotor member 32 of the side stand switch 5.

The pivot-bolt 4 is inserted into the bores 17 and 18 of the pair of connecting portions 15 and 16 and the bore 13 of the bracket 2, with the bracket 2 sandwiched between the pair of connecting portions 15 and 16. A middle portion 23 of the pivot-bolt 4 is inserted into the bore 17 of the connecting portion 15 and the bore 13 of the bracket 2, whereas a threaded portion 24 at an end of the pivot-bolt 4 is inserted into the bore 18 of the other connecting portion 16 and partially exposed to the outside.

The pivot-bolt 4 is secured to the pair of connecting portions 15 and 16 by screwing a securing nut 7 onto the exposed threaded portion 24 and tightening the securing nut 7. Thus, the side stand bar 3 and the pivot-bolt 4 are turned together relative to the bracket 2. A head portion 21 of the pivot-bolt 4 has a screw hole 22 into which the securing bolt 6 is to be screwed.

The side stand switch 5 is configured to detect whether the side stand bar 3 is located at the standing position or the retracted position. The side stand switch 5 is attached to the head portion 21 of the pivot-bolt 4 by the securing bolt 6. A case member 31 of the side stand switch 5 has a clamping portion 34, by which the through pin 12 is clamped at one end. This allows positioning of the side stand switch 5. The configuration of the side stand switch 5 will be described in detail later on.

The securing bolt 6 is passed through the side stand switch 5, screwed into the screw hole 22 of the pivot-bolt 4, and tightened to secure the side stand switch 5 to the pivot-bolt 4. The securing bolt 6 has a circular flange 27 at its head. With the flange 27, the side stand switch 5 can be pressed stably.

Figure 3:
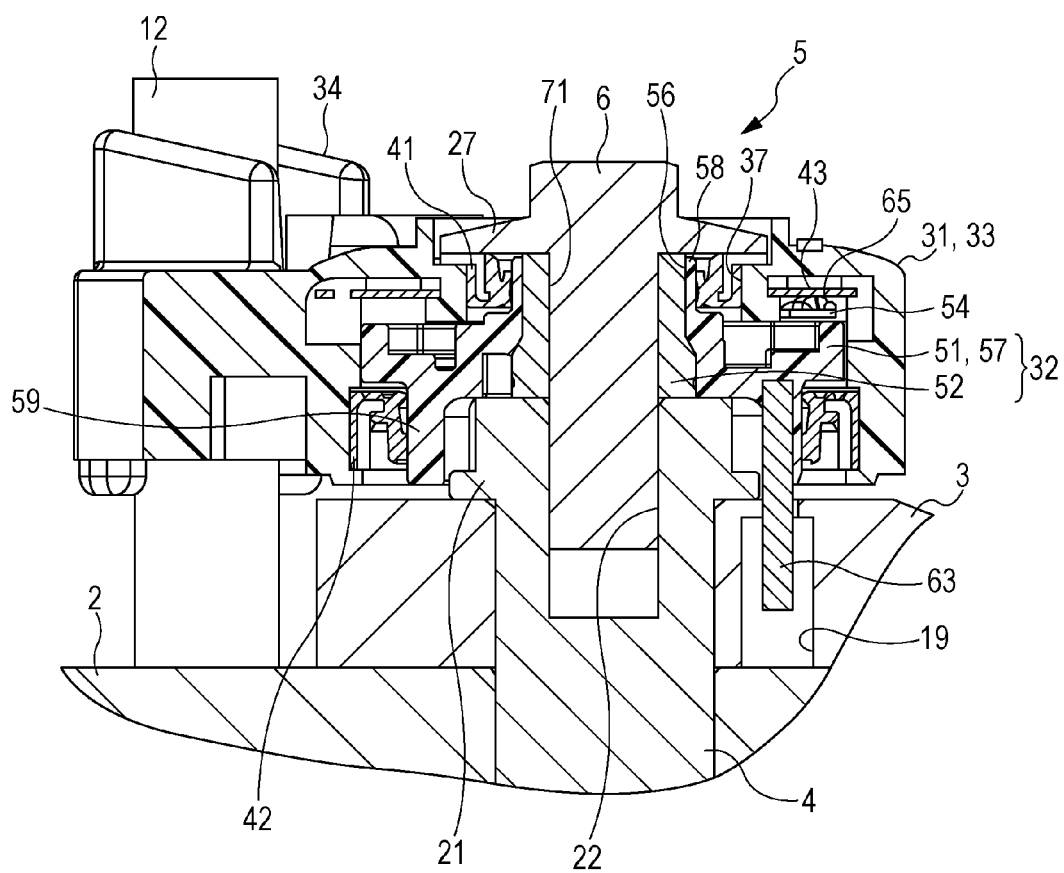
FIG. 3 is a partial cross-sectional view of the side stand device.
Figure 4:
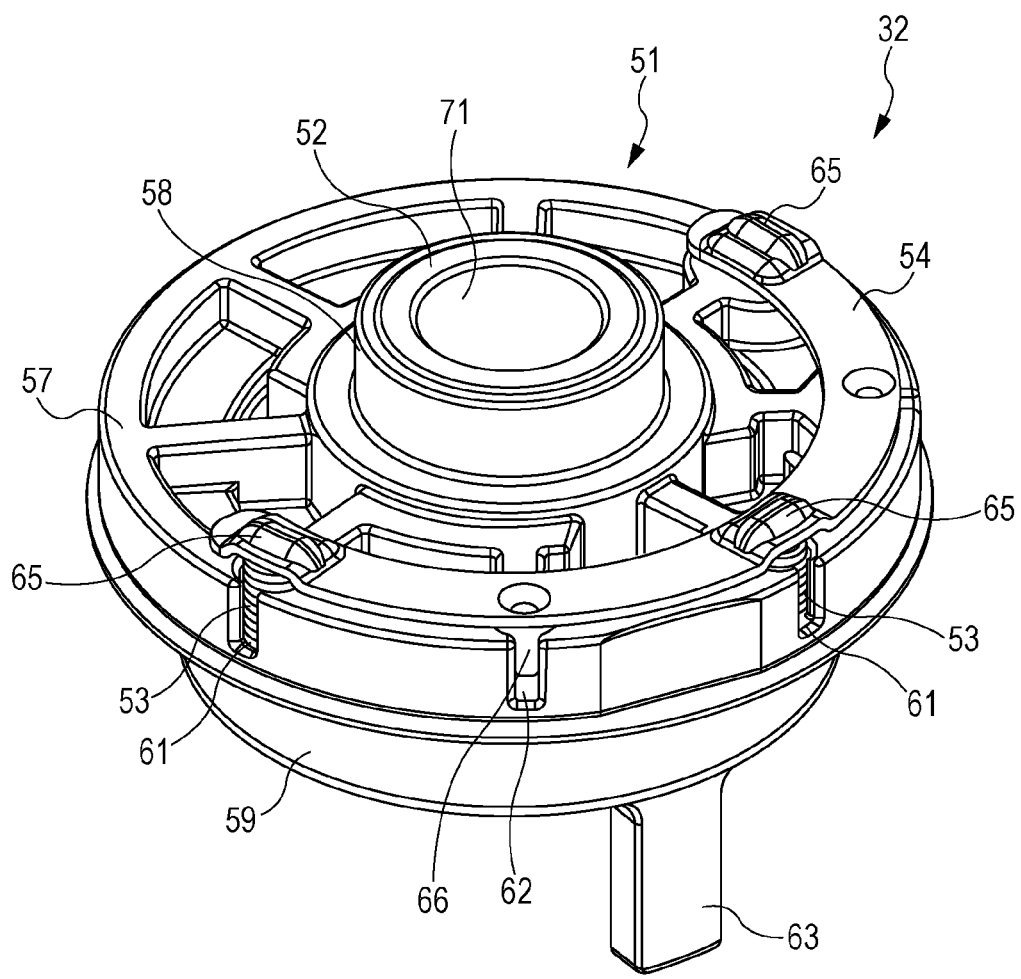
FIG. 4 is a perspective view illustrating a rotor member of a side stand switch according to an embodiment of the present invention.
Figure 5:
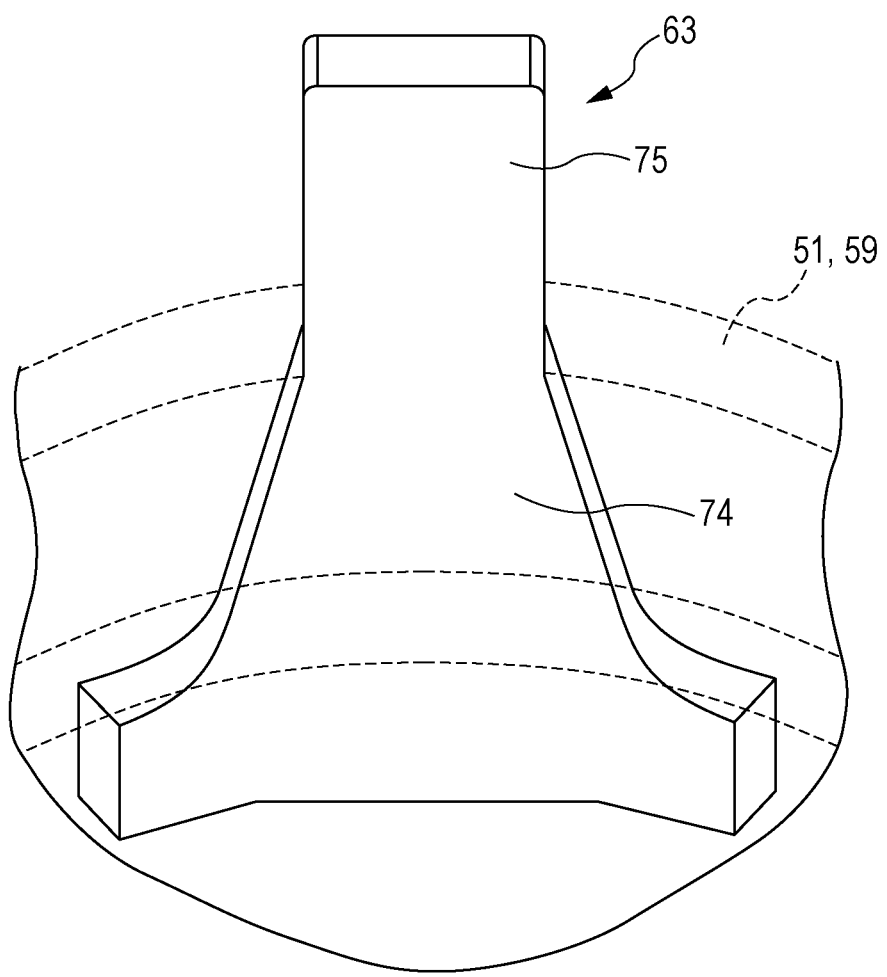
FIG. 5 is a perspective view illustrating an engagement pin of the side stand switch.

A configuration of a side stand switch will now be described in detail with reference to FIG. 3 to FIG. 5. FIG. 3 is a partial cross-sectional view of the side stand device 1. FIG. 4 is a perspective view of the rotor member 32. FIG. 5 is a perspective view illustrating an engagement pin 63 of the side stand switch 5. For convenience of description, a rotor body 51 is indicted by a broken line in FIG. 5.

As illustrated in FIG. 3 and FIG. 4, the side stand switch 5 includes the case member 31 rotationally restricted by the one part of the through pin 12, and the rotor member 32 rotatably housed inside the case member 31. The case member 31 is molded of synthetic resin etc. The case member 31 includes a tubular portion 33 open at the bottom thereof and the clamping portion 34 disposed to a side of the tubular portion 33. An upper wall of the tubular portion 33 has a circular opening 37, which is provided with an annular bearing member 41 that rotatably supports an upper part of the rotor member 32. A lower part of a side wall of the tubular portion 33 is provided with an annular bearing member 42 that rotatably supports a lower part of the rotor member 32.

The upper wall of the tubular portion 33 has a fixed contact 43 around the circular opening 37. The fixed contact 43 is exposed to the interior of the tubular portion 33. The fixed contact 43 includes an arc-shaped common fixed contact and two (first and second) individual fixed contacts arranged in an annular form. The first individual fixed contact corresponds to the retracted position of the side stand bar 3, and the second individual fixed contact corresponds to the standing position of the side stand bar 3. A driving state of the motorcycle is detected when the common fixed contact is brought into conduction with the first individual fixed contact. A parking state of the motorcycle is detected when the common fixed contact is brought into conduction with the second individual fixed contact.

The rotor member 32 includes the rotor body 51 rotatably supported with respect to the case member 31, and a torque receiving member 52 frictionally engaged in an opening 56 in the center of the rotor body 51. The rotor body 51 is molded of synthetic resin etc. The rotor body 51 includes an annular disk portion 57 having the opening 56 in the center thereof, an annular upper shaft portion 58 protruding upward from the edge of the opening 56 of the disk portion 57, and an annular lower shaft portion 59 protruding downward from the outer periphery of the disk portion 57.

The upper surface of the disk portion 57 has retainers 61 for retaining three coil springs 53 and positioning holes 62 for positioning a moving contact 54, along the outer periphery of the disk portion 57. The retainers 61 and the positioning holes 62 are alternately spaced evenly in the circumferential direction. The moving contact 54 is placed on upper ends of the three coil springs 53. The moving contact 54 has a semi-arc shape. The moving contact 54 has contact portions 65 at three points, at both ends and in the middle, in the direction in which the moving contact 54 extends. The moving contact 54 also has anchoring portions 66 between adjacent ones of the contact portions 65. The anchoring portions 66 are provided for positioning purposes. The moving contact 54 is positioned on the disk portion 57 by anchoring the anchoring portions 66 in the respective positioning holes 62. This allows the contact portions 65 to be positioned above the respective coil springs 53. Thus, the moving contact 54 is configured to move together with the rotor body 51 while being biased from the back side thereof toward the fixed contact 43 by the coil springs 53.

The upper shaft portion 58 has a hollow cylindrical shape and is rotatably supported by the bearing member 41. The lower shaft portion 59 contains the head portion 21 of the pivot-bolt 4 and is rotatably supported by the bearing member 42. Thus, the rotor body 51 is rotatably supported by the bearing members 41 and 42 at both upper and lower ends. Therefore, the rotor body 51 is stably held inside the case member 31. The engagement pin 63 made of metal is inserted in the lower shaft portion 59. The engagement pin 63 protrudes downward from the lower end face of the lower shaft portion 59 and is inserted into the engagement hole 19 of the side stand bar 3. With this configuration, the rotor body 51 is engaged through the engagement pin 63 with the side stand bar 3 and turned together with the side stand bar 3.

The engagement pin 63 is formed of a thin metal plate. As illustrated in FIG. 5, a support plate portion 74 on a base side of the engagement pin 63 is embedded in the rotor body 51, whereas an engagement plate portion 75 on a tip side of the engagement pin 63 protrudes from the rotor body 51. The engagement pin 63 is disposed such that its surface is along the periphery of the lower shaft portion 59. The engagement pin 63 is configured to come into contact with the inner surface of the engagement hole 19 of the side stand bar 3 on side faces (thickness faces), which are high in strength. The engagement plate portion 75 protrudes in specified shape and dimensions. As described below, a torque load is applied to the engagement plate portion 75 when the securing bolt 6 is tightened. The support plate portion 74 may have a skirt shape whose width increases toward a direction opposite the protruding direction (i.e., toward the inside of the rotor body 51). Thus, the support plate portion 74 has high stiffness against the torque load.

Referring back to FIG. 3, the torque receiving member 52 may be a metal member having a hollow cylindrical shape. The torque receiving member 52 is press-fitted into the opening 56 of the rotor body 51. The torque receiving member 52 may have an insertion hole 71 in the center thereof. The insertion hole 71 is for insertion of a shaft portion of the securing bolt 6. Through the insertion hole 71, the securing bolt 6 is screwed into the screw hole 22 of the pivot-bolt 4. Thus, an upper end face of the torque receiving member 52 may be brought into contact with a back surface of the flange 27 of the securing bolt 6, while a lower end face of the torque receiving member 52 may be brought into contact with an upper surface of the head portion 21 of the pivot-bolt 4.

In the side stand device 1 configured as described above, a driver raises the side stand bar 3 when driving the motorcycle. The side stand bar 3 pivots about the pivot-bolt 4 from the standing position to the retracted position. The pivoting of the side stand bar 3 causes the rotor body 51 to rotate through the engagement pin 63. This allows the contact portions 65 of the moving contact 54 on the rotor body 51 to bring the common fixed contact of the fixed contact 43 into conduction with the first individual fixed contact of the fixed contact 43. Thus, the side stand switch 5 detects that the side stand bar 3 is located at the retracted position.

On the other hand, the driver lowers the side stand bar 3 when parking the motorcycle. The side stand bar 3 pivots about the pivot-bolt 4 from the retracted position to the standing position. The pivoting of the side stand bar 3 causes the rotor body 51 to rotate through the engagement pin 63. This allows the contact portions 65 of the moving contact 54 on the rotor body 51 to bring the common fixed contact of the fixed contact 43 into conduction with the second individual fixed contact of the fixed contact 43. Thus, the side stand switch 5 detects that the side stand bar 3 is located at the standing position.

Figure 6:
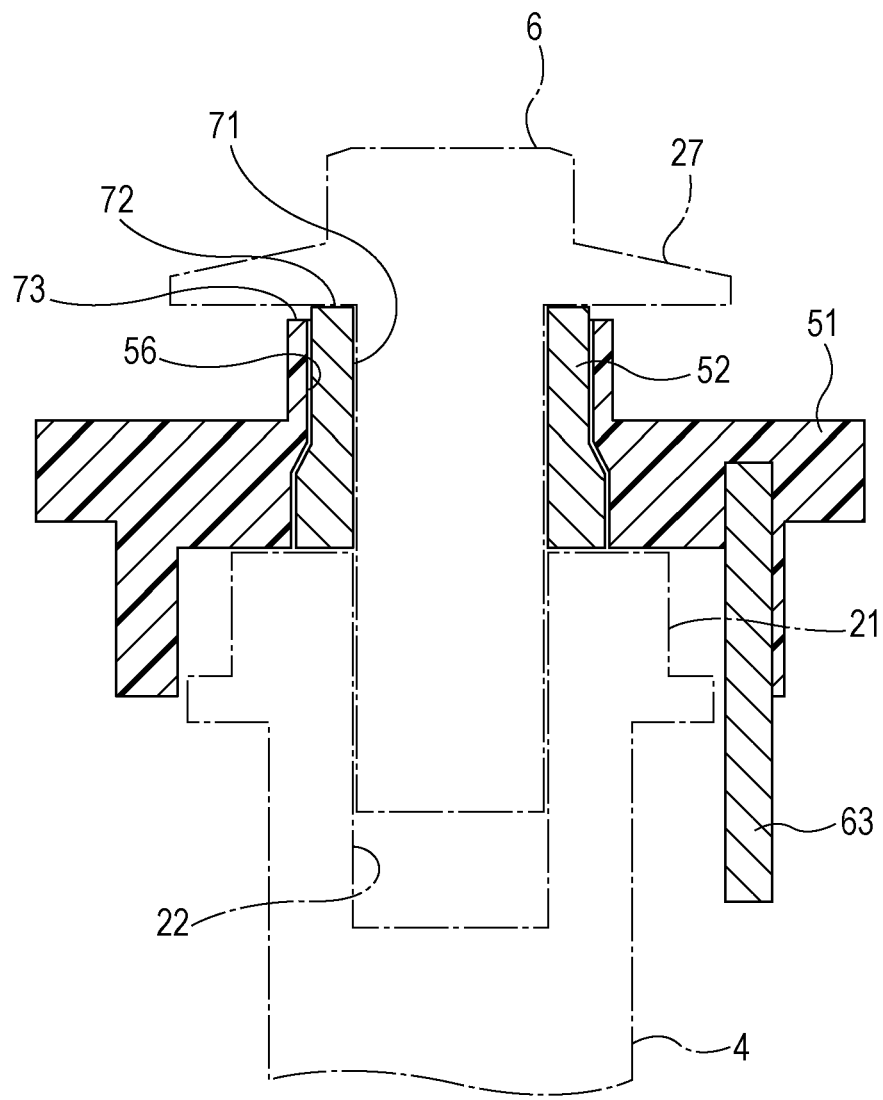
FIG. 6 illustrates a state of engagement between a rotor body and a torque receiving member of the side stand switch.

Next, a state of engagement between a rotor body and a torque receiving member will be described with reference to FIG. 6. FIG. 6 illustrates a state of engagement between the rotor body 51 and the torque receiving member 52. For convenience of description, the securing bolt 6 and the pivot-bolt 4 are indicated by dotted-chain lines in FIG. 6.

As illustrated in FIG. 6, the rotor body 51 and the torque receiving member 52 may be frictionally engaged with each other by press-fitting such that they can rotate relative to each other. An upper end face 72 of the torque receiving member 52 may protrude above the level of an upper end face 73 of the rotor body 51 and may come into contact with the back surface of the flange 27 of the securing bolt 6. Thus, the upper end face 73 of the upper shaft portion 58 may be separated from the back surface of the flange 27 of the securing bolt 6. Therefore, when the securing bolt 6 is tightened, the toque is prevented from being directly transmitted from the securing bolt 6 to the rotor body 51.

The frictional force between the engagement surfaces of the rotor body 51 and the torque receiving member 52 is smaller than the torque produced by tightening the securing bolt 6. The rotor body 51 and the torque receiving member 52 are configured to rotate relative to each other only when a torque exceeding a certain level is transmitted to the rotor body 51. The securing bolt 6 and the rotor body 51 rotate relative to each other only when a large torque is applied during tightening. Therefore, after tightening, the frictional engagement between the rotor body 51 and the torque receiving member 52 prevents rattling and chattering caused by vibration.

In the present embodiment, the torque receiving member 52 is press-fitted into the opening 56 of the rotor body 51. However, the present invention is not limited to this configuration. Any configuration is possible as long as the rotor body 51 and the torque receiving member 52 are engaged with each other by an engagement force smaller than a torque produced by tightening the securing bolt 6. For example, the torque receiving member 52 may be engaged with the opening 56 of the rotor body 51 by insertion molding or snap fitting.

Figure 7A:
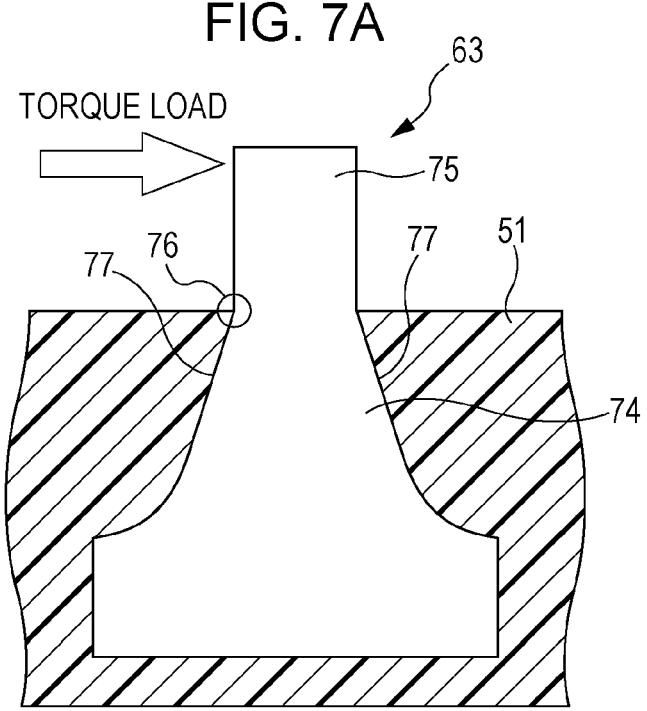
FIG. 7A and FIG. 7B illustrate how the engagement pin is configured to withstand a torque load.
Figure 7B:
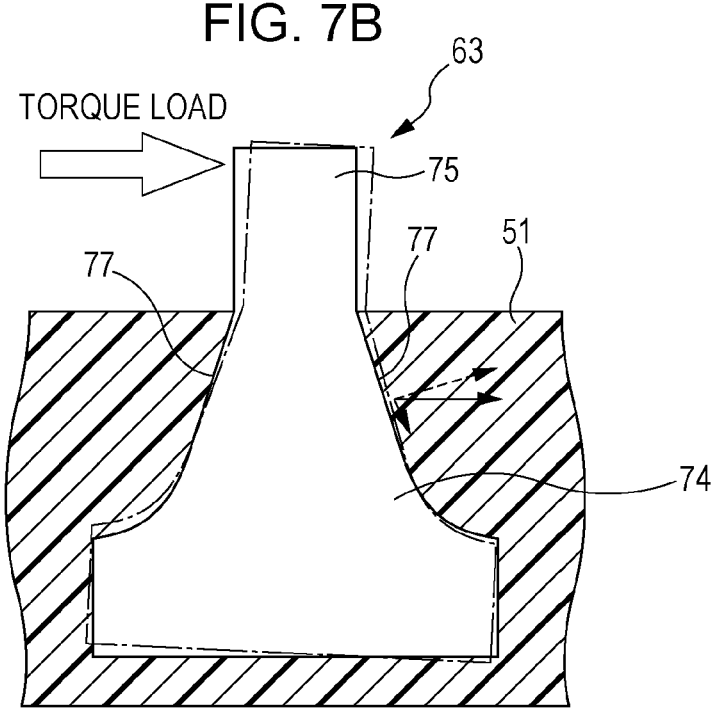

With reference to FIG. 7A and FIG. 7B, an engagement pin structure for withstanding a torque load will be described, which is a feature of the present invention. FIG. 7A and FIG. 7B illustrate how the engagement pin 63 is configured to withstand a torque load.

As illustrated in FIG. 7A, the support plate portion 74 on the base side of the engagement pin 63 is embedded in the rotor body 51, with the engagement plate portion 75 on the tip side of the engagement pin 63 protruding from the rotor body 51. The support plate portion 74 has a skirt shape whose width increases from the lower end of the engagement plate portion 75 toward the inside of the rotor body 51. The support plate portion 74 thus has higher stiffness against a torque load than the engagement plate portion 75. Therefore, when a torque load is applied to the engagement plate portion 75, a stress concentration point 76 appears at the boundary between the engagement plate portion 75 and the support plate portion 74.

Thus, in the engagement pin 63 of the present embodiment, the stress concentration point 76 is brought closer to an area of the engagement plate portion 75 adjacent to the tip of the engagement pin 63, that is, an area to which a torque load is applied. A load applied to the stress concentration point 76 increases with an increasing distance between the stress concentration point 76 and the area to which a torque load is applied. In the engagement pin 63, where the stress concentration point 76 and the area to which a torque load is applied are close to each other, a load applied to the stress concentration point 76 is small. The engagement pin 63 receives a torque load on thickness faces 77 and improves its durability against the torque load. This improves the strength of the engagement pin 63 and prevents the engagement pin 63 from being deformed (damaged) at the stress concentration point 76 by the torque load.

As illustrated in FIG. 7B, the support plate portion 74 is supported inside the rotor body 51 to increase the area of contact between the support plate portion 74 and the rotor body 51. The engagement pin 63 is thus tightly connected, on the base side, with the rotor body 51. Even if the engagement pin 63 and the rotor body 51 are made of different materials, the tight connection between the engagement pin 63 and the rotor body 51 can be ensured. The support plate portion 74 has the inclined thickness faces 77 inside the rotor body 51. When a torque load is applied to the engagement plate portion 75, the torque load is distributed on the thickness face 77 as indicated by broken lines. This reduces the force acting in the direction of deforming (damaging) the rotor body 51. It is thus possible to prevent the entire engagement pin 63 from leaning and deforming the rotor body 51, and improve the strength of the connection between the rotor body 51 and the engagement pin 63.

In the engagement pin 63 of the present embodiment, it is possible to reduce a load applied to the stress concentration point 76 and improve the strength of the engagement pin 63 against a torque load. Additionally, since the torque load is distributed on the thickness face 77 of the support plate portion 74, the engagement pin 63 can be prevented from leaning and deforming the rotor body 51. Even if the rotor body 51 is made of material of relatively low strength, such as resin, the engagement pin 63 can be supported integrally with the rotor body 51.

If the rotor body 51 is molded of resin, the degree of freedom in designing the shape of the rotor body 51 can be improved. Additionally, as compared to the case where the rotor body 51 is molded of metal, the manufacturing cost of molding can be reduced. The weight of the side stand switch 5 can also be reduced. At the same time, since the area of metal surface of the side stand switch 5 is reduced, the cost of rust preventive plating can be reduced.

Figure 8:
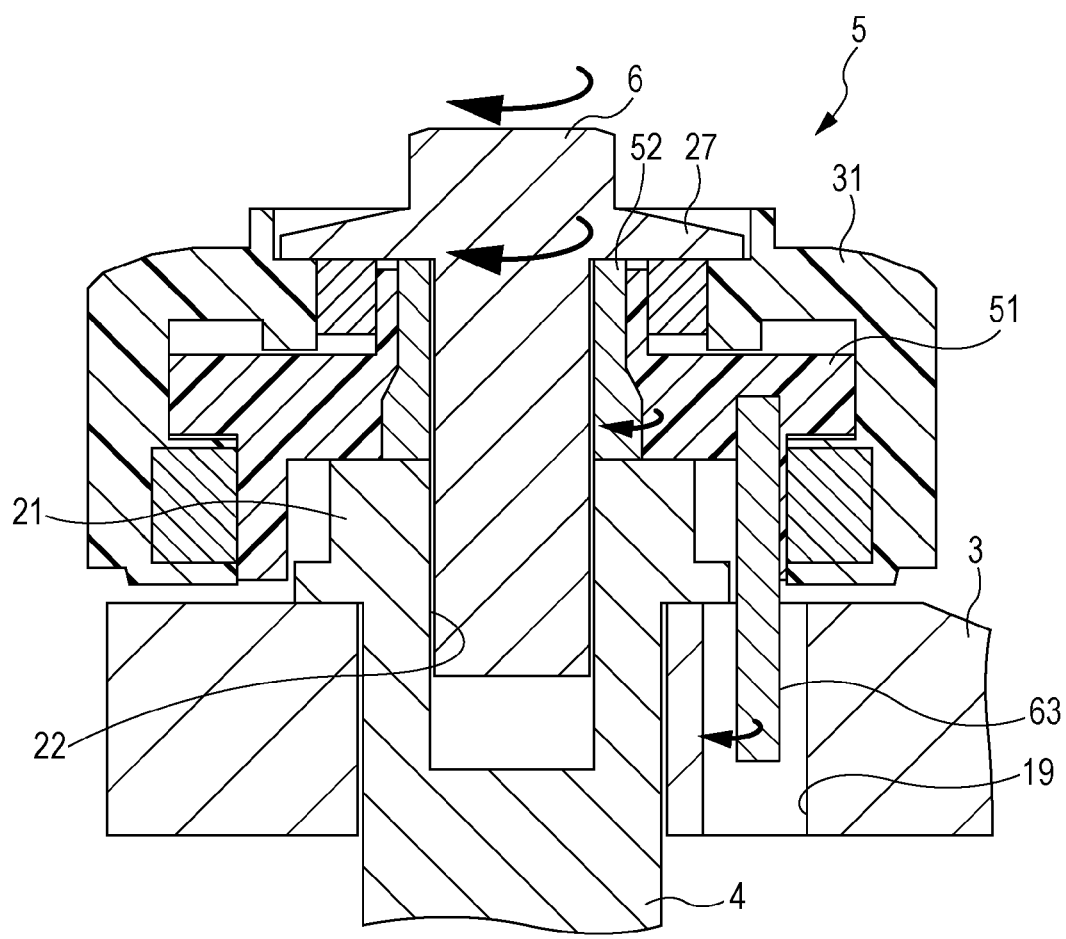
FIG. 8 illustrates how the side stand switch is mounted.

A mounting structure of a side stand switch will now be described with reference to FIG. 8. FIG. 8 illustrates how the side stand switch 5 is mounted. Each arrow in FIG. 8 represents the magnitude of torque.

As illustrated in FIG. 8, when the securing bolt 6 is tightened with the side stand switch 5 placed on the pivot-bolt 4, a torque produced by tightening the securing bolt 6 is transmitted to the torque receiving member 52. The torque transmitted to the torque receiving member 52 is further transmitted to the rotor body 51 through the engagement surfaces of the torque receiving member 52 and the rotor body 51. The rotor body 51 is rotationally secured to the side stand bar 3 by the engagement pin 63, and the frictional force between the torque receiving member 52 and the rotor body 51 is smaller than the torque from the securing bolt 6. Therefore, the torque receiving member 52 is rotated relative to the rotor body 51.

The relative rotation of the torque receiving member 52 and the rotor body 51 absorbs the torque from the securing bolt 6 and significantly reduces the torque transmitted from the torque receiving member 52 to the rotor body 51. Since the torque transmitted to the rotor body 51 is reduced, a torque load applied to the engagement pin 63 is reduced. As described above, in the engagement pin 63, a load on the stress concentration point 76 caused by a torque load is reduced. At the same time, the engagement pin 63 is prevented from leaning from the standing position in the rotor body 51. Thus, the torque load applied to the engagement pin 63 is reduced, and the strength of the engagement pin 63 and the strength of connection between the engagement pin 63 and the rotor body 51 are improved. Therefore, it is possible to effectively prevent damage to the engagement pin 63 and the rotor body 51.

After tightening of the securing bolt 6, the rotor body 51 and the torque receiving member 52 function as a rigid body because of the frictional engagement therebetween. This can prevent rattling and chattering caused by vibration.

As described above, in the side stand switch 5 of the present embodiment, where the engagement pin 63 is larger in width at the support plate portion 74 on the base side than at the engagement plate portion 75 on the tip side, the stress concentration point 76 is brought closer to the tip portion of the engagement pin 63 to which a torque load is applied by tightening the securing bolt 6. Therefore, a load applied to the stress concentration point 76 of the engagement pin 63 is reduced. Since the relative rotation of the rotor body 51 and the torque receiving member 52 absorbs the torque, the torque load applied to the engagement pin 63 is further reduced. It is thus possible to improve the strength of the engagement pin 63 against the torque load and prevent the engagement pin 63 from being damaged.

In the embodiment described above, the engagement pin has a skirt shape on the base side. However, the present invention is not limited to this configuration. The engagement pin may have any shape as long as it is larger in width at its base portion embedded in the rotor member than at its tip portion protruding from the rotor member. For example, the base portion of the engagement pin may have a rectangular or circular shape which is larger in width than the tip portion of the engagement pin.

Figure 9:
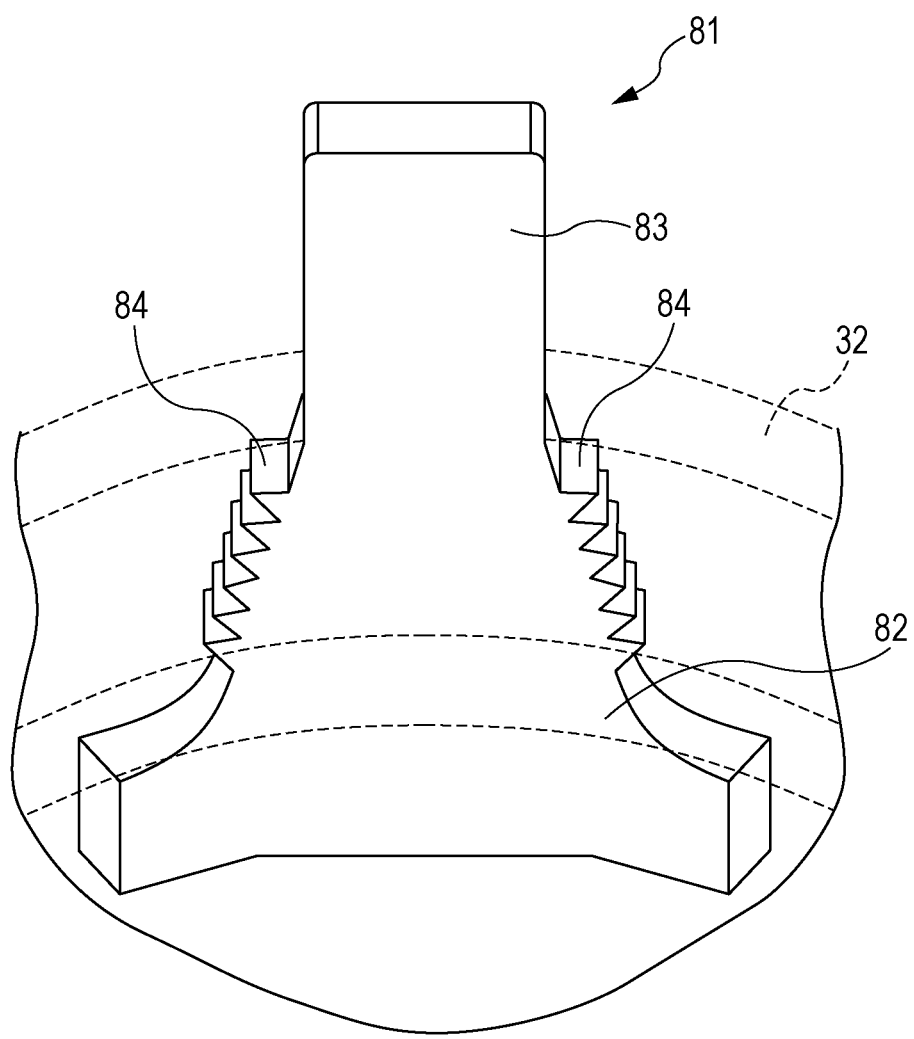
FIG. 9 illustrates a modification of the side stand switch.

Although the thickness faces on the base side of the engagement pin are flat in the embodiment described above, they may have protrusions and indentations (i.e., may be serrated) as illustrated in FIG. 9. In an engagement pin 81 illustrated in FIG. 9, a support plate portion 82 on the base side is embedded in the rotor member 32, and an engagement plate portion 83 on the tip side protrudes from the rotor member 32. The support plate portion 82 may increase its width in a direction opposite the protruding direction (i.e., toward the inside of the rotor member 32). As illustrated, thickness faces 84 of the support plate portion 82 may have protrusions and indentations. With this configuration, where the base portion of the engagement pin 81 is engaged with the rotor member 32 on the thickness faces 84 having protrusions and indentations, the engagement allows the entire engagement pin 81 to be firmly supported integrally with the rotor member 32 by the torque load.

Specifically, the plurality of protrusions and indentations of the thickness faces 84 increase the area of contact between the rotor member 32 and the engagement pin 81, allow fine distribution of the torque load, and reduce the force acting in the direction of deforming (damaging) the rotor member 32. It is thus possible to prevent the entire engagement pin 81 from leaning and deforming the rotor member 32, and improve the strength of connection between the rotor member 32 and the engagement pin 81. The configuration of the engagement pin is not limited to that in which the thickness faces of the engagement pin have a plurality of protrusions and indentations. The engagement pin may have a configuration in which each thickness face has one set of protrusion and indentation.

In the embodiment described above, the rotor body and the torque receiving member are frictionally engaged with each other. However, the present invention is not limited to this configuration. Any configuration is possible as long as the engagement force between the rotor body and the torque receiving member is smaller than a torque from the securing bolt. For example, the rotor body and the torque receiving member may be configured to slide.

In the embodiment described above, one end face of the torque receiving member in the axial direction may be brought into contact with the back surface of the flange of the securing bolt, so that one end face of the rotor body in the axial direction is separated from the back surface of the flange. However, the present invention is not limited to this configuration. Any configuration is possible as long as the rotor body receives a torque through the torque receiving member.

Although the securing bolt has been described as an example of the fastening member in the embodiment above, the present invention is not limited to this configuration. Any configuration is possible as long as the side stand switch is mounted by tightening the fastening member. For example, the fastening member may be a securing nut.

Although the side stand switch is mounted on the pivot-bolt in the embodiment described above, the present invention is not limited to this configuration. The side stand switch may be mounted in any manner in any part of the side stand device as long as it can detect the pivot position of the side stand bar.

In the embodiment described above, the rotor member is configured such that the torque from the fastening member is absorbed by relative rotation of the rotor body and the torque receiving member. However, the present invention is not limited to this configuration. The rotor member may be configured not to include the rotor body and the torque receiving member and not to allow absorption of the torque from the fastening member. Even with such a configuration of the rotor member, it is still possible to reduce a load on the stress concentration point of the engagement pin. Therefore, the engagement pin can be prevented from being damaged by tightening the fastening member.

Although the rotor member (rotor body) may be molded of resin in the embodiment described above, the present invention is not limited to this configuration. The rotor member may be molded of any material. The engagement pin of the present invention is particularly effective for use with a rotor member of low strength.

The embodiments disclosed herein are merely examples in all respects, and the present invention is not limited to these embodiments. The scope of the present invention is defined not by the above-described embodiments but by the claims, and is intended to include all modifications within the meaning and range equivalent to the claims.

As described above, the present invention has an effect of preventing an engagement pin in a rotor member from being damaged during tightening of a fastening member. The present invention is particularly effective when applied to a side stand switch configured to detect a pivot position of a side stand bar that supports a two-wheeled vehicle, such as a motorcycle, and to a side stand device including the side stand switch.

What is claimed is:

1. A side stand switch comprising:
    a case member having a fixed contact; and
    a rotor member having a moving contact that can come into contact with the fixed contact, mounted by tightening a fastening member, and turned together with a side stand bar with respect to the case member,
    wherein the rotor member has an engagement pin inserted therein and to be inserted into an engagement hole formed in the side stand bar; and
    a width of the engagement pin in the turning direction of the rotor member is larger at a base portion inside the rotor member than at a tip portion protruding from the rotor member.

2. The side stand switch according to claim 1, wherein the base portion of the engagement pin is formed such that the width in the turning direction of the rotor member gradually increases in a direction opposite the protruding direction.

3. The side stand switch according to claim 2, wherein the base portion of the engagement pin is formed such that contact faces thereof in contact with the rotor member in the turning direction of the rotor member each have at least one protrusion and one indentation.

4. The side stand switch according to claim 1, wherein the rotor member is molded of resin, and the engagement pin is made of metal.

5. The side stand switch according to claim 2, wherein the rotor member includes a rotor body having the moving contact and the engagement pin, and a torque receiving member relatively rotatably engaged with the rotor body and configured to receive a torque produced by tightening the fastening member; and
    the rotor body receives the torque through the torque receiving member.

6. The side stand switch according to claim 5, wherein the side stand bar is pivotally attached through a pivot-bolt to a bracket on a vehicle body frame;
    the fastening member is a securing bolt configured to mount the rotor member to the pivot-bolt;
    the torque receiving member has a tubular shape with a bore into which a shaft portion of the securing bolt is to be inserted, a back surface of a head portion of the securing bolt is brought into contact with one end face of the torque receiving member in an axial direction, and an upper surface of a head portion of the pivot-bolt is brought into contact with the other end face of the torque receiving member in the axial direction; and
    the rotor body is separated from the back surface of the head portion of the securing bolt at one end face adjacent to the head portion of the securing bolt in the axial direction.

7. A side stand device comprising:
    a side stand bar configured to support a vehicle body in a standing state;
    a bracket on a vehicle body frame;
    a pivot-bolt configured to pivotally attach the side stand bar to the bracket;
    the side stand switch according to claim 1; and
    a securing bolt configured to mount the side stand switch to the pivot-bolt by being tightened.

8. A side stand device comprising:
    a side stand bar configured to support a vehicle body in a standing state;
    a bracket on a vehicle body frame;
    a pivot-bolt configured to pivotally attach the side stand bar to the bracket;
    s side stand switch according to claim 2; and
    a securing bolt configured to mount the side stand switch to the pivot-bolt by being tightened.

9. A side stand device comprising:
    a side stand bar configured to support a vehicle body in a standing state;
    a bracket on a vehicle body frame;
    a pivot-bolt configured to pivotally attach the side stand bar to the bracket;
    the side stand switch according to claim 3; and
    a securing bolt configured to mount the side stand switch to the pivot-bolt by being tightened.

10. A side stand device comprising:
    a side stand bar configured to support a vehicle body in a standing state;
    a bracket on a vehicle body frame;
    a pivot-bolt configured to pivotally attach the side stand bar to the bracket;
    the side stand switch according to claim 4; and
    a securing bolt configured to mount the side stand switch to the pivot-bolt by being tightened.

11. A side stand device comprising:
a side stand bar configured to support a vehicle body in a standing state;
a bracket on a vehicle body frame;
a pivot-bolt configured to pivotally attach the side stand bar to the bracket;
the side stand switch according to claim 5; and
a securing bolt configured to mount the side stand switch to the pivot-bolt by being tightened.

12. A side stand device comprising:
a side stand bar configured to support a vehicle body in a standing state;
a bracket on a vehicle body frame;
a pivot-bolt configured to pivotally attach the side stand bar to the bracket;
the side stand switch according to claim 6; and
a securing bolt configured to mount the side stand switch to the pivot-bolt by being tightened.

\* \* \* \* \*